(12) United States Patent
Mattson et al.

(10) Patent No.: US 7,109,853 B1
(45) Date of Patent: Sep. 19, 2006

(54) SYSTEM FOR DETECTING AND RELEASING A PERSON LOCKED IN THE TRUNK OF A VEHICLE

(75) Inventors: Daniel J. Mattson, Kenosha, WI (US); Kerry S. Berland, Chicago, IL (US); Kenneth C. Kunin, Gurnee, IL (US)

(73) Assignee: Cherry Corporation, Pleasant Prairie, WI (US)

( * ) Notice: Subject to any disclaimer, the term of this patent is extended or adjusted under 35 U.S.C. 154(b) by 0 days.

(21) Appl. No.: 09/558,386

(22) Filed: Apr. 25, 2000

Related U.S. Application Data

(60) Provisional application No. 60/131,189, filed on Apr. 26, 1999.

(51) Int. Cl.
*B60R 25/10* (2006.01)

(52) U.S. Cl. ............................ 340/426.29; 340/426.26; 340/426.3; 340/438; 340/573.1; 340/632; 701/92; 454/229; 236/94

(58) Field of Classification Search ............ 340/425.5, 340/426, 576, 438, 426.29, 426.26, 525.5, 340/457.3, 573.1, 632; 296/76; 205/782.5, 205/781; 204/432; 73/16, 23.2, 23.3; 307/10.1, 307/10.2; 70/92; 454/229; 236/94

See application file for complete search history.

(56) References Cited

U.S. PATENT DOCUMENTS

| | | | |
|---|---|---|---|
| 3,647,392 A | 3/1972 | McGinnis | 422/88 |
| 3,673,069 A | 6/1972 | Niedrach et al. | 204/414 |
| 3,992,909 A | 11/1976 | McGhee | 70/379 R |
| 4,321,545 A | 3/1982 | Cameron | 324/442 |
| 4,508,598 A | 4/1985 | Giner | 205/782.5 |
| 4,691,701 A | 9/1987 | Williams | 128/207.14 |
| 4,715,944 A | 12/1987 | Yanagida et al. | 204/426 |
| 4,742,761 A | 5/1988 | Horstman | 98/1.5 |
| 4,846,937 A | 7/1989 | Driscoll et al. | 205/782.5 |
| 4,851,088 A | 7/1989 | Chandrasekhar et al. | 205/782.5 |
| 4,879,461 A | 11/1989 | Philipp | 250/221 |
| 4,926,164 A * | 5/1990 | Porter et al. | 340/576 |
| 5,071,526 A | 12/1991 | Pletcher et al. | 205/782.5 |
| 5,132,663 A * | 7/1992 | Strobl et al. | 340/438 |
| 5,194,134 A | 3/1993 | Futata et al. | 204/421 |
| 5,371,659 A | 12/1994 | Pastrick et al. | 362/83.1 |
| 5,404,128 A | 4/1995 | Ogino et al. | 340/425.5 |
| 5,445,326 A | 8/1995 | Ferro et al. | 292/336 |
| 5,464,369 A * | 11/1995 | Federspiel | 454/256 |
| 5,468,451 A | 11/1995 | Gedeon | 454/256 |
| 5,480,611 A | 1/1996 | Mills et al. | 422/55 |

(Continued)

FOREIGN PATENT DOCUMENTS

DE  198 36 935 C 1  3/2000

(Continued)

OTHER PUBLICATIONS

Inspectair™ -CO2 Carbon Dioxide Monitor Model 8560—Frequently Asked Questions.

(Continued)

*Primary Examiner*—Davetta W. Goins
(74) *Attorney, Agent, or Firm*—Brinks Hofer Gilson & Lione

(57) ABSTRACT

A vehicle safety system automatically detects the presence of a person sealed in the trunk of an automobile by sensing the $CO_2$ respiration of the person. Visible, audio and radio alarms are generated in response to the detection of a person in the trunk. If the vehicle is stopped, the trunk will automatically open and allow the person to escape.

43 Claims, 2 Drawing Sheets

U.S. PATENT DOCUMENTS

| | | | |
|---|---|---|---|
| 5,522,980 A | 6/1996 | Hobbs et al. | 204/432 |
| 5,554,912 A | 9/1996 | Thayer et al. | 315/157 |
| 5,598,141 A | 1/1997 | Grasmann et al. | 340/426 |
| 5,653,386 A | 8/1997 | Hennessee et al. | 237/12.3 B |
| 5,669,704 A | 9/1997 | Pastrick | 362/83.1 |
| 5,682,145 A | 10/1997 | Sweetman et al. | 340/632 |
| 5,693,943 A | 12/1997 | Tchernihovski et al. | 250/342 |
| 5,694,653 A | 12/1997 | Harald | 4/623 |
| 5,742,516 A | 4/1998 | Olcerst | 700/276 |
| 5,775,406 A * | 7/1998 | Ghitea, Jr. | 165/11.1 |
| 5,793,291 A | 8/1998 | Thornton | 340/573 |
| 5,856,646 A | 1/1999 | Simon | 200/600 |
| 5,859,479 A | 1/1999 | David | 307/10.8 |
| 5,910,239 A | 6/1999 | Maier et al. | 205/781 |
| 5,912,624 A | 6/1999 | Howard, II | 340/632 |
| 5,920,057 A * | 7/1999 | Sonderegger et al. | 235/384 |
| 5,938,321 A | 8/1999 | Bos et al. | 362/494 |
| 5,949,340 A | 9/1999 | Rossi | 340/573.1 |
| 6,018,292 A | 1/2000 | Penny, Jr. | 340/426 |
| 6,086,131 A * | 7/2000 | Bingle et al. | 296/76 |
| 6,139,172 A | 10/2000 | Bos et al. | 362/494 |
| 6,150,927 A * | 11/2000 | Nesbitt | 340/426 |
| 6,166,625 A | 12/2000 | Teowee et al. | 340/426 |
| 6,254,261 B1 | 7/2001 | Bingle et al. | 362/501 |
| 6,278,377 B1 | 8/2001 | DeLine et al. | 340/815.4 |
| 6,349,984 B1 | 2/2002 | Marrazzo et al. | 292/336.3 |
| 6,390,529 B1 | 5/2002 | Bingle et al. | 296/76 |
| 6,420,975 B1 | 7/2002 | DeLine et al. | 340/815.4 |
| 6,428,172 B1 | 8/2002 | Hutzel et al. | 359/838 |
| 6,460,906 B1 | 10/2002 | Bingle et al. | 296/336.3 |
| 6,480,103 B1 | 11/2002 | McCarthy et al. | 340/425.5 |
| 6,485,081 B1 | 11/2002 | Bingle et al. | 296/76 |
| 6,621,411 B1 | 9/2003 | McCarthy et al. | 340/425.5 |
| 6,692,056 B1 | 2/2004 | Bingle et al. | 296/76 |
| 6,783,167 B1 | 8/2004 | Bingle et al. | 296/76 |
| 6,832,793 B1 | 12/2004 | Bingle et al. | 292/336.3 |
| 6,902,284 B1 | 6/2005 | Hutzel et al. | 359/865 |
| 2005/0023858 A1 | 2/2005 | Bingle et al. | 296/76 |

FOREIGN PATENT DOCUMENTS

| | | | |
|---|---|---|---|
| EP | 1039077 A2 | | 9/2000 |
| EP | 1039077 A3 | | 9/2000 |
| JP | 10-278564 A | | 10/1998 |
| WO | WO 98/36950 A | | 8/1998 |
| WO | WO 99/04119 | * | 1/1999 |
| WO | WO 00/58584 | | 10/2000 |

OTHER PUBLICATIONS

National Safe Kids Campaign and General Motors Educate Public About Trunk Entrapment Hazards to Children.

"Total Recall", Home Technology, article from Popular Science, Jun. 1999 (1 page).

Figaro Sensor Materials, pp. 3-13, 15-17, 19-24 (1996-1999) (20 pages).

*Patent Abstracts of Japan*, vol. 1999, No. 1, Jan. 29, 1999, Abstracts for Japanese Published Patent Application JP 10-278564 A.

* cited by examiner

US 7,109,853 B1

SYSTEM FOR DETECTING AND RELEASING A PERSON LOCKED IN THE TRUNK OF A VEHICLE

CROSS REFERENCE TO U.S. PRIORITY APPLICATION

This nonprovisional application claims the benefit of U.S. Provisional Application Ser. No. 60/131,189, filed Apr. 26, 1999.

BACKGROUND OF THE INVENTION

1. Technical Field of the Invention

The present invention concerns safety systems for operating automobiles and, more particularly, to such a system that detects the presence of a person in a closed trunk and releases the person under safe operational conditions.

2. Description of the Related Art

There have been well publicized reports of young children inadvertently locking themselves in the trunk of a vehicle, such as an automobile. Tragically, children can die under such circumstances, typically as a result of heat prostration while trapped in the sealed trunk.

It has been suggested that a trapped person could actuate an inside release mechanism to open the trunk. However, it is not certain that a young child would understand how to operate such a mechanism and it is therefore possible that the child would not be able to free himself by this means. There is therefore a need for a system that detects the presence of a person, particularly a small child, within a trunk and signals the need to open the trunk. It would also be advantageous for such a system to automatically trigger a trunk to open and release the trapped person when it is safe to do so, for example when the vehicle is stopped.

There is therefore a great need for an automatic trunk safety system. The apparatus and system of the invention has been developed to meet this need with simple, relatively low cost and reliable components that are easily integrated with the electronic control systems of existing vehicles. The above-mentioned features and other features of the invention will become apparent from a review of the following drawings, specification and claims.

SUMMARY OF THE INVENTION

One embodiment of the apparatus and system of the invention includes a sensor that detects $CO_2$ that is exhaled by a person trapped in the closed trunk of a vehicle. A microprocessor compares the level of $CO_2$ detected in the trunk to a baseline level of $CO_2$ that was measured the last time the trunk was opened. If excessive $CO_2$ is detected, the microprocessor determines the operational state of the vehicle and takes programmed steps to provide an alarm and to automatically open the trunk if the vehicle is not moving.

Other embodiments of the invention can use infrared sensors or electrostatic (i.e., capacitive) sensors to detect a person in the trunk. Systems with such sensors would also operate automatically to provide an alarm and to open the trunk under safe operational conditions.

DETAILED DESCRIPTION OF THE PREFERRED EMBODIMENTS

Figure 1:
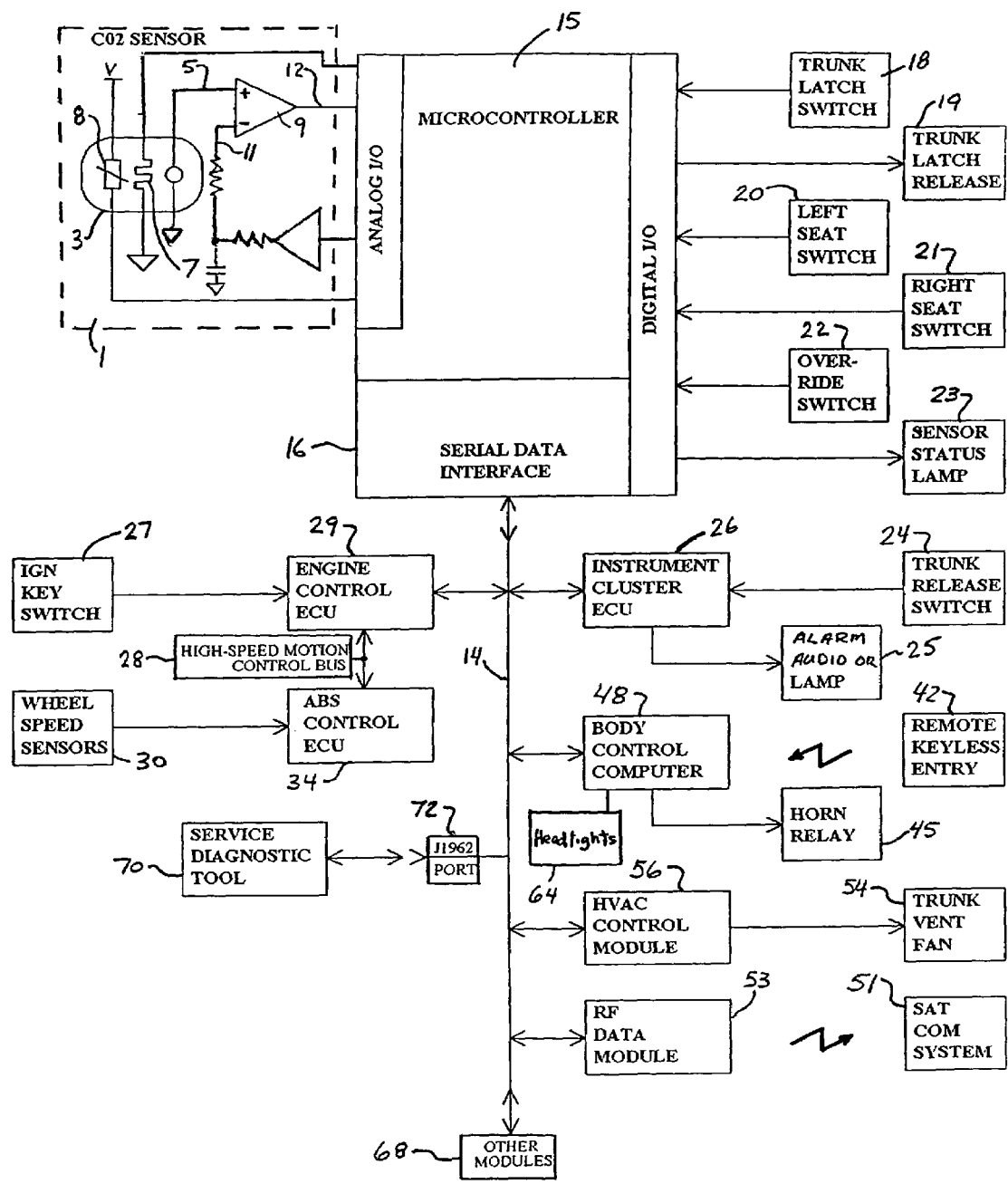
FIG. 1 is a block diagram of the $CO_2$ sensor, microcontroller and related apparatus that provide the trunk safety features of the invention.

In the drawings, elements are not necessarily drawn to scale, and the same reference numbers through several views designate the same or similar elements. FIG. 1 illustrates a block diagram of components of the system of the invention in association with known electronic components of a modern vehicle. A $CO_2$ sensor 1 includes the elements shown within the dashed lines. This sensor has a $CO_2$ sensing component 3 that detects the level of $CO_2$ in the trunk of a vehicle such as an automobile.

$CO_2$ sensors are commercially available. A preferred sensor is sold by Figaro USA, Inc. of Glenview, Ill. with the model designation TGS4160. This solid electrolyte sensor generates an output voltage on a line 5 that corresponds to the level of detected $CO_2$. The sensor includes a heater element 7 that must be energized in initial operation to heat the sensor to a specific operational temperature. The sensor therefore requires some initial time, for example, about 60 seconds, to stabilize before it can make a reliable $CO_2$ reading. A thermistor 8 senses the temperature of the sensor and applies a corresponding voltage to a microcontroller 15 that, as an example, may be a model 68705P6A device which is commercially available from Motorola. The output voltage of the sensor is applied to the plus input of a difference operational amplifier 9 that also receives at its minus input 11 a reference voltage from the microcontroller 15. The operational amplifier 9 generates an output voltage on line 12 that corresponds to the difference between the voltage at its plus and minus inputs.

In initial operation, the reference voltage at 11 from the microcontroller is zero and the operational amplifier 9 generates a voltage at 12 that corresponds to the ambient concentration of $CO_2$ in the trunk. The voltage corresponding to this ambient or baseline $CO_2$ concentration is amplified within the microcontroller, temperature compensated, and applied at 11 as a pulse width modulated signal with a duty cycle that is adjusted to provide a reference voltage that corresponds to the background $CO_2$ in the trunk.

If a person is thereafter trapped in the trunk, the level of $CO_2$ will gradually rise above the background level. As the concentration of $CO_2$ in the trunk rises, the voltage on the line 5 increases and the amplifier 9 generates a voltage that corresponds to the difference between the increased voltage on the line 5 and the background reference voltage on the line 11. The output of the amplifier at 12 therefore corresponds to the relative increase in the concentration of $CO_2$ from the baseline. The "delta" voltage corresponding to the change in the concentration of $CO_2$ is applied to the microcontroller and, if a specified magnitude of this voltage, for example 1 volt, is maintained for a specified time, for example 30 seconds, the microcontroller registers an alarm. The alarm magnitude of $CO_2$ may be set to correspond to the respiration of the lowest weight person within the parameters of the system.

The microcontroller 15 receives vehicle status signals and transmits control signals over a serial bus 14, through a serial data interface 16 that may operate with the J1850 or Controller Area Network protocols as an example. Other protocols could also be used.

With reference to FIG. 1 as an example, the microcontroller may be hardwired to a trunk latch switch 18, a trunk release solenoid 19, left and right rear seat switches that indicate the latched or unlatched condition of these seats at 20 and 21, an override switch for temporarily disarming the $CO_2$ sensor at 22 and a status lamp at 23 that indicates the operational condition of the $CO_2$ detection system, for example by blinking.

The serial bus communicates with the instrument cluster electronic control unit 26 which receives a signal from the manual trunk release switch 24 and controls a $CO_2$ panel alarm lamp and/or audio alarm 25. An engine control module 29 monitors the operational state of the ignition key switch 27 and interacts in a known manner with an automatic braking system 34 that connects with a high-speed motion control bus 28 and receives signals from wheel speed sensors 30 that indicate whether the vehicle is moving. A body control computer 48 controls a relay 45 that operates the vehicle horn and lights and responds to a remote keyless entry system 42 in a known manner. A radio frequency data module 53 can be actuated to send radio alarm signals to a remote security station via a satellite communication system 51 in a known manner. A heating, ventilation and airconditioning module 56 operates a vent fan 54 in a known manner. The fan could be disposed to vent the trunk, for example, in response to a $CO_2$ alarm. A known plug-in service diagnostic tool 70, other known vehicle control modules 68 and the headlights 64 are connected and operated on the serial data bus 14 in a known manner. All of the apparatus on the serial bus is monitored and controlled through the microcontroller 15 that also controls the operation of the $CO_2$ detection system. If necessary, the microcontroller could be implemented with flash memory to facilitate program changes in the field.

As an alternative to the use of a serial data bus to send and receive vehicle control signals, the microcontroller 15 could be directly connected to send and receive these signals using a dedicated wire for each signal. In such a system, an ignition on signal from the ignition key switch 27 would connect directly to the microcontroller 15, rather than indirectly through the engine control ECU 29 and a serial data bus 14. Likewise, wheel speed sensors 30, trunk release switch 24, audio alarm or lamp 25, headlights 64, horn relay 45, trunk vent fan 54, and any other such vehicle control apparatus would connect directly to the microcontroller, rather than through associated modules and a serial data bus.

Figure 2:
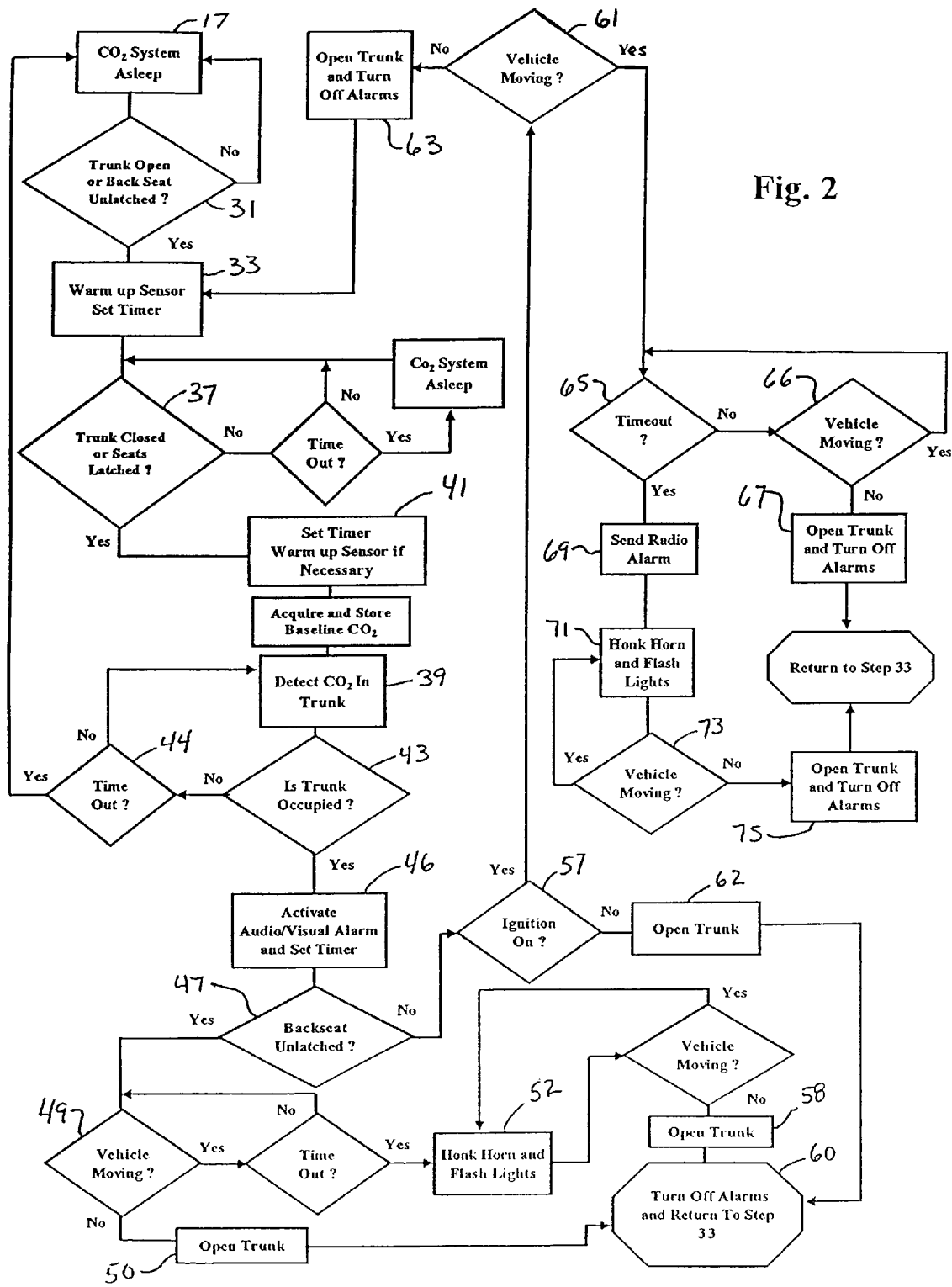
FIG. 2 is a flow chart of program steps used by the microcontroller to implement the trunk safety system of the invention.

FIG. 2 illustrates a flow chart of microprocessor program steps that implement the system of a preferred embodiment of the invention. As shown at the top of FIG. 2, for the purpose of this discussion, the $CO_2$ detection system is initially assumed to be in a sleep state at 17 wherein the system waits for an activation condition. The system is awakened or activated at least in response to opening the trunk of the vehicle or unlatching either of the back seats. With reference to FIG. 1, when the trunk is opened or at least one back seat is unlatched, the switches 18, 20, 21 indicate the activation condition. The activation signal is passed to the microcontroller 15, for example over a hardwired connection.

With reference to FIG. 2, the microcontroller 15 therefore detects the activation condition at 31 and wakes up and sets a delay time to process $CO_2$ information. With reference to FIG. 1, when the microcontroller 15 wakes up, the $CO_2$ sensor 3 is already energized. The heater 7 is then turned on, the system then waits for the sensor to heat up, for example for about 60 seconds, and the microcontroller 15 then waits for the trunk to close or the back seats to latch at 37.

The microcontroller checks the condition of the trunk and seats at 37 by interrogating the switches 18, 20, and 21. If the switches do not close within a predefined delay time, for example several minutes, the microcontroller is put to sleep to await activation by closing the trunk or latching the seats. When activated, the baseline $CO_2$ is acquired and stored, a timer is set and, if necessary, the sensor is warmed up. The concentration of $CO_2$ in the trunk is measured at 39 during a predefined time-out interval of, for example several minutes. If an increase in the level of $CO_2$ is detected in an amount that would be exhaled by a human being, the "trunk occupied" condition is triggered at 43. The system is put to sleep if the timer times out at 44.

Experimentation and investigation have indicated that healthy human beings generally exhale $CO_2$ in amounts proportional to their body weight. Thus, for example, a 180 pound adult would exhale about 0.3 liters of $CO_2$ per minute, a toddler of 20 pounds would exhale about 0.033 liters of $CO_2$ per minute and an infant of 7 pounds would exhale about 0.012 liters of $CO_2$ per minute. The microcontroller 15 is programmed to measure the increase in $CO_2$ within the trunk over time in relation to the measured baseline $CO_2$ and make a determination that the increasing $CO_2$ results from the respiration of a human being.

As an initial approximation, if the largest trunk contains about 566 liters of air, it has been determined that the $CO_2$ sensor will detect respiration at about 530 PPM (parts per million) per minute for an adult, 59 PPM per minute for a toddler and about 21 PPM per minute for an infant. This increase in measured $CO_2$ over a reasonable time, for example up to several minutes, distinguishes the respiration of a human being from expected changes in ambient $CO_2$. The detection of a gradual increase in $CO_2$ also serves to distinguish an abrupt increase in $CO_2$ that might result if a person intentionally injects $CO_2$ into the trunk in an effort to confuse the $CO_2$ detection system. As an example, it has been found that human respiration can be distinguished by measuring a predetermined change in the output voltage of the operational amplifier 9 of FIG. 1, for example a change of about 1 volt, for an interval of about 30 seconds.

With reference to FIG. 2, if an occupant is not detected in the trunk within a predefined set time, the timer times out at 44 and the microcontroller 15 terminates its detection of $CO_2$ and sets itself in a low power sleep mode defined at step 17. The microcontroller will remain asleep until the trunk is opened again or at least one rear seat is unlatched.

If the level of $CO_2$ detected in the trunk indicates an occupant is present, the microcontroller 15 at step 46 turns on the $CO_2$ lamp 25 of FIG. 1 and/or provides an audio alarm on the front console of the vehicle, sets a timer and checks the condition of the latches on the back seats of the vehicle at step 47.

If a back seat is unlatched, the trunk is ventilated through the airspace provided by the unlatched seat and the level of alarm is therefore reduced. As shown at step 47, if a back seat is unlatched, the movement of the vehicle is checked at 49 and the front console alarms are continued for a time-out period. If the vehicle stops during this period, the trunk is automatically opened by the trunk release solenoid 19 (FIG. 1) at step 50 to allow the person to escape safely. The alarms are then turned off and program control is returned to step 33. If the vehicle continues moving, the timer times out, and at step 52 the horn is activated at 45, 48 (FIG. 1) and the headlights are flashed at 64 (FIG. 1). This continues for as long as the vehicle continues moving. If the vehicle stops, the trunk is automatically opened at step 58 to allow the person to escape, the alarms are turned off at step 60 and program control is returned to step 33. When the trunk is closed, the $CO_2$ concentration is checked and the system is put to sleep if there is no alarm condition or, if the trunk remains open beyond a time-out interval, the system is put to sleep until the trunk is closed.

If an occupant is detected in the trunk and it is found at step 47 that the back seats are latched, the status of the ignition system 27, 29 (FIG. 1) is then checked at step 57 (FIG. 2). If the ignition is turned off, the microcontroller 15 sends an "open trunk" signal to the trunk release solenoid 19 (FIG. 1) at step 62 (FIG. 2) and therefore causes the trunk to open. The trunk is opened in this situation because the vehicle is stopped and it is therefore safe to open the trunk and allow the occupant to escape. After opening the trunk, the alarms are turned off and program control is returned to step 33.

If the sensed condition of the ignition at step 57 is "on", the microcontroller 15 at step 61 determines whether the vehicle is moving by analyzing wheel speed signals from sensors 30 of FIG. 1. If the vehicle is not moving, the trunk is automatically opened at step 63, the alarms are turned off and program control is returned to step 33. The trunk may be opened in these circumstances, because, even though the ignition is on, the vehicle is not moving and it is therefore safe for the occupant to leave the trunk.

If the vehicle is moving at step 61, the microcontroller 15 times out a predetermined interval at step 65 and continuously checks at step 66 to determine if the vehicle remains moving during this interval. If the vehicle stops during this interval, the trunk is opened at step 67 to allow the occupant to escape, the alarms are turned off, and control is returned to step 33 as previously described. If the vehicle is still moving at the end of the time-out interval of step 65, a higher level of alarm is generated at step 69 by triggering a radio alert at 51, 53 (FIG. 1) to call a remote security station. Also, at step 71, the horn is actuated and the lights are flashed as previously described. When these higher level alarms are set, the movement status of the vehicle is again checked at step 73 and, if the vehicle stops, the alarms are turned off and the trunk is opened at step 75 and program control is returned to step 33 as previously described. If the vehicle continues to move, alarms continue to operate until the vehicle stops.

Variations and modifications of the embodiments disclosed herein may be made without departing from the scope and spirit of the invention. For example, the $CO_2$ detector may be replaced or augmented by infrared and electrostatic capacitive sensors. At present it is believed that use of a $CO_2$ sensor is preferred, because infrared and electrostatic sensors might not be able to detect a person if, for example, the trunk is partially filled with cargo. The system could also be modified to open an air vent to the trunk or partially open the trunk to allow ventilation in the event of an alarm condition. Additional conditions would also be defined to wake up the microcontroller to process peripheral equipment or interrupts for vehicle systems other than the $CO_2$ system. The aforementioned description of embodiments of the invention is therefore intended to be illustrative rather than limiting and it should therefore be understood that the following claims and their equivalents set forth the scope of the invention.

The invention claimed is:

1. A method for monitoring the trunk of a vehicle, comprising the steps of:
   detecting the respiration of a living person or animal in the closed trunk of a vehicle;
   detecting the operational condition of the vehicle; and
   automatically opening the trunk of the vehicle in response to a predefined safe operational condition of the vehicle and the detection of the respiration of the living person or animal in the trunk.

2. The method of claim 1, wherein said step of detecting the respiration of a living person or animal includes the step of detecting the $CO_2$ exhaled by the person or animal in respiration.

3. The method of claim 1, wherein said step of detecting the respiration of a living person or animal includes the step of detecting a rise in the level of $CO_2$ in the trunk over time in relation to a predefined baseline $CO_2$.

4. The method of claim 1, wherein said step of detecting the respiration of a living person or animal includes the steps of:
   detecting a baseline concentration of $CO_2$ after the trunk has been opened;
   comparing the concentration of $CO_2$ measured for a time after the trunk is closed to the baseline concentration of $CO_2$; and
   detecting the respiration of a living person or animal when the concentration of $CO_2$ in the trunk exceeds the baseline concentration by a predetermined amount for a predetermined time.

5. The method of claim 1, further including the steps of providing a lighted switch in the trunk; and having a person in the trunk manually activate the switch to open the trunk from the inside.

6. The method of claim 1, including the step of automatically opening the trunk of the vehicle when the vehicle is stopped and a living person or animal is detected in the trunk.

7. The method of claim 1, including the step of providing an alarm but not opening the trunk when a living person or animal is detected in the trunk and the vehicle is moving.

8. The method of claim 1, including the step of providing an alarm but not opening the trunk when a living person or animal is detected in the trunk and a back seat of the vehicle is unlatched to ventilate the trunk.

9. The method of claim 1, including the step of providing an audible alarm in the vehicle in response to detecting a living person or animal in the trunk.

10. The method of claim 1, including the step of providing a visible alarm in the vehicle in response to detecting a living person or animal in the trunk.

11. The method of claim 1, including the step of providing an alarm signal to a security center in response to detecting a living person or animal in the trunk.

12. The method of claim 1, including the step of activating the horn of the vehicle in response to detecting a living person or animal in the trunk.

13. The method of claim 1, including flashing the headlights of the vehicle in response to detecting a living person or animal in the trunk.

14. A method for determining the respiration of a living person or animal in an enclosure, comprising the steps of:
   ventilating the enclosure to ambient air and automatically sensing a base line concentration of $CO_2$ in the vented enclosure;
   closing the enclosure to ambient air and automatically sensing an increase in the concentration of $CO_2$ above said base line concentration for a predetermined time after the enclosure is closed to ambient air; and
   providing a rescue operation in response to detecting $CO_2$ above said base line concentration which is consistent with what would be produced by respiration of a living person or animal in the closed enclosure.

15. The method of claim 14, further including the steps of using a vehicle trunk as the enclosure and automatically opening the trunk of the vehicle as a rescue operation when the vehicle is stationary.

16. The method of claim 15, further including the steps of providing a lighted switch in the trunk; and having a person in the trunk manually activate the switch to open the trunk from the inside.

17. The method of claim 14, further including the steps of using a passenger compartment of a vehicle as the enclosure and automatically ventilating the compartment as a rescue operation.

18. The method of claim 14, further including the step of detecting the respiration of a living person or animal when the concentration of $CO_2$ in the closed enclosure exceeds the base line concentration of $CO_2$ by a predetermined amount for a predetermined time.

19. An apparatus for sensing the presence of a person in the trunk of a vehicle, comprising:
   a $CO_2$ sensor for detecting a baseline concentration of $CO_2$ after the trunk has been opened and the concentration of $CO_2$ for a time after the trunk is closed; and
   a microcontroller for comparing the concentration of $CO_2$ when the trunk is closed to the baseline concentration Of $CO_2$ and generating an alarm indicating the presence of a person in the trunk when the concentration of $CO_2$ in the closed trunk exceeds the baseline concentration of $CO_2$ by a predetermined amount for a predetermined time.

20. The apparatus of claim 19, including a lighted switch disposed in the trunk for manually opening the trunk from the inside.

21. The apparatus of claim 19, including means for sensing the movement of the vehicle and means for opening the trunk when a person is sensed in the trunk and the vehicle is stopped.

22. A method for determining the presence of a person in a closed trunk of a vehicle, comprising the steps of:
   sensing a base line concentration of $CO_2$ in the trunk with at least one opening to ambient air;
   sensing an increase in concentration of $CO_2$ above said base line concentration when the trunk is closed to ambient air; and
   generating an alarm in response to detecting $CO_2$ above said base line concentration which is consistent with what would be produced by respiration of a person in the closed trunk.

23. The method of claim 22, further including the steps of ventilating the trunk in response to said alarm.

24. The method of claim 22, further including the step of ventilating the trunk in response to said alarm and the detection of a predefined temperature in the closed trunk.

25. The method of claim 1, including providing an alarm when the respiration of the living person or animal is detected.

26. The method of claim 1, including providing an alarm when the respiration of the living person or animal is detected and selecting the type of alarm based upon the operational condition of the vehicle.

27. A method for controlling a vehicle having a compartment that is opened and closed, comprising the steps of:
   detecting the respiration of a living person or animal in the closed compartment of the vehicle;
   detecting the operational condition of the vehicle; and
   automatically opening the compartment of the vehicle to ambient air in response to a predefined operational condition of the vehicle and the detection of the respiration of the living person or animal in the compartment.

28. A method for controlling a vehicle having a trunk that is opened and closed, comprising the steps of:
   detecting the respiration of a living person or animal in the closed trunk of the vehicle;
   detecting the operational condition of the vehicle;
   automatically selecting at least one of a plurality of alarms based upon the operational condition of the vehicle and the detected respiration of the living person or animal in the trunk; and
   activating the at least one selected alarm.

29. A method for controlling a vehicle having a trunk that is selectively opened and closed, comprising the steps of:
   detecting the respiration of a living person or animal in the closed trunk of the vehicle; and
   automatically opening the trunk in response to at least detecting the respiration of the living person or animal in the trunk.

30. A method for detecting an unsafe condition within a trunk of a vehicle, comprising the steps of:
   disposing a living person or animal within the closed trunk of the vehicle; and
   detecting the respiration of the living person or animal in the trunk.

31. A detection system for use within a vehicle of the type having a trunk which is selectively movable between an open and a closed position, said detection system being adapted to detect the breathing of a breathing individual within said trunk, said detection system comprising:
   a breathing detector which is disposed within said trunk, which is adapted to detect the breathing of said individual, and which generates a signal upon the detection of said breathing; and
   a controller assembly which is communicatively coupled to said breathing detector, which receives said signal, and which opens said trunk upon receipt of said signal.

32. The detection system of claim 31, wherein carbon dioxide is emitted by said individual as said individual breathes and wherein said breathing detector detects the presence of said carbon dioxide within said trunk.

33. The detection system of claim 31, wherein said vehicle is of the further type which includes an ignition switch which may be selectively moved to a certain position and wherein said controller assembly is coupled to said ignition switch, senses said placement of said ignition switch in said certain position, and causes said trunk to be opened in response to said signal from said breathing detector only if said ignition switch is placed in said certain position.

34. The detection system of claim 31, wherein said vehicle is of the type which is selectively driven and wherein said controller assembly prevents said trunk from being open when said vehicle is driven.

35. The detection system of claim 31, further including an illuminated switch which is disposed within said trunk, which is coupled to said controller assembly, and which selectively communicates a second signal to said controller assembly upon being touched.

36. The detection system of claim 35, wherein said controller assembly, upon receipt of said second signal, opens said trunk.

37. The detection system of claim 32, wherein said breathing detector measures the amount of carbon dioxide which is resident within said trunk, stores a certain value, compares said measured amount of carbon dioxide to said certain value, and generates said signal only if said measured amount of said carbon dioxide is greater than said certain value.

38. The detection system of claim 31, wherein said controller assembly further includes a timer which allows said detection system to be operable for a certain period of time.

39. The detection system of claim 31, wherein said individual comprises a child.

40. A method for detecting the presence of a child within a trunk of a vehicle, said method comprising the steps of:
   measuring an amount of carbon-dioxide within said trunk of said vehicle; and
   using said measured amount of carbon dioxide to determine the presence of said child within said trunk of said vehicle.

41. The method of claim 40, further comprising the step of detecting said presence of said child only when said vehicle is stationary.

42. An assembly for detecting the presence of an individual within a trunk of a vehicle, said assembly comprising:
   a sensor which is mounted within said trunk and that detects the occurrence of breathing of said individual; and
   a controller assembly which is communicatively coupled to said sensor and which provides a signal when said sensor detects the occurrence of breathing of said individual.

43. The assembly of claim 42, wherein said sensor comprises a carbon dioxide sensor.

\* \* \* \* \*

UNITED STATES PATENT AND TRADEMARK OFFICE
CERTIFICATE OF CORRECTION

| | | |
|---|---|---|
| PATENT NO. | : 7,109,853 B1 | |
| APPLICATION NO. | : 09/558386 | |
| DATED | : September 19, 2006 | |
| INVENTOR(S) | : Mattson et al. | |

It is certified that error appears in the above-identified patent and that said Letters Patent is hereby corrected as shown below:

Please delete Patent 7,109,853 in its entirety and insert Patent 7,109,853 as attached.

Signed and Sealed this
Twenty-ninth Day of November, 2011

David J. Kappos
*Director of the United States Patent and Trademark Office*

(12) United States Patent
Mattson et al.

(10) Patent No.: US 7,109,853 B1
(45) Date of Patent: Sep. 19, 2006

(54) SYSTEM FOR DETECTING AND RELEASING A PERSON LOCKED IN THE TRUNK OF A VEHICLE

(75) Inventors: Daniel J. Mattson, Kenosha, WI (US); Kerry S. Berland, Chicago, IL (US); Kenneth C. Kunin, Gurnee, IL (US)

(73) Assignee: Cherry Corporation, Pleasant Prairie, WI (US)

(*) Notice: Subject to any disclaimer, the term of this patent is extended or adjusted under 35 U.S.C. 154(b) by 0 days.

(21) Appl. No.: 09/558,386

(22) Filed: Apr. 25, 2000

Related U.S. Application Data

(60) Provisional application No. 60/131,189, filed on Apr. 26, 1999.

(51) Int. Cl.
*B60R 25/10* (2006.01)

(52) U.S. Cl. .......... 340/426.29; 340/426.26; 340/426.3; 340/438; 340/573.1; 340/632; 701/92; 454/229; 236/94

(58) Field of Classification Search ............ 340/425.5, 340/426, 576, 438, 426.29, 426.26, 525.5, 340/457.3, 573.1, 632; 296/76; 205/782.5, 205/781; 204/432; 73/16, 23.2, 23.3; 307/10.1, 307/10.2; 70/92; 454/229; 236/94
See application file for complete search history.

(56) References Cited

U.S. PATENT DOCUMENTS

| | | | |
|---|---|---|---|
| 3,647,392 A | 3/1972 | McGinnis | 422/88 |
| 3,673,069 A | 6/1972 | Niedrach et al. | 204/414 |
| 3,992,909 A | 11/1976 | McGhee | 70/379 R |
| 4,321,545 A | 3/1982 | Cameron | 324/442 |
| 4,508,598 A | 4/1985 | Giner | 205/782.5 |
| 4,691,701 A | 9/1987 | Williams | 128/207.14 |
| 4,715,944 A | 12/1987 | Yanagida et al. | 204/426 |
| 4,742,761 A | 5/1988 | Horstman | 98/1.5 |
| 4,846,937 A | 7/1989 | Driscoll et al. | 205/782.5 |
| 4,851,088 A | 7/1989 | Chandrasekhar et al. | 205/782.5 |
| 4,879,461 A | 11/1989 | Philipp | 250/221 |
| 4,926,164 A * | 5/1990 | Porter et al. | 340/576 |
| 5,071,526 A | 12/1991 | Pletcher et al. | 205/782.5 |
| 5,132,663 A * | 7/1992 | Strobl et al. | 340/438 |
| 5,194,134 A | 3/1993 | Futata et al. | 204/421 |
| 5,371,659 A | 12/1994 | Pastrick et al. | 362/83.1 |
| 5,404,128 A | 4/1995 | Ogino et al. | 340/425.5 |
| 5,445,326 A | 8/1995 | Ferro et al. | 292/336 |
| 5,464,369 A * | 11/1995 | Federspiel | 454/256 |

(Continued)

FOREIGN PATENT DOCUMENTS

DE 198 36 935 C 1 3/2000

(Continued)

OTHER PUBLICATIONS

Inspectair™ -CO2 Carbon Dioxide Monitor Model 8560—Frequently Asked Questions.

(Continued)

*Primary Examiner* — Davetta W. Goins
(74) *Attorney, Agent, or Firm* — Brinks Hofer Gilson & Lione

(57) ABSTRACT

A vehicle safety system automatically detects the presence of a person sealed in the trunk of an automobile by sensing the $CO_2$ respiration of the person. Visible, audio and radio alarms are generated in response to the detection of a person in the trunk. If the vehicle is stopped, the trunk will automatically open and allow the person to escape.

43 Claims, 4 Drawing Sheets

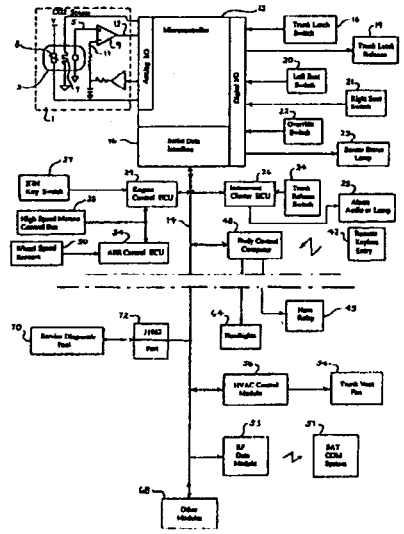

U.S. PATENT DOCUMENTS

| | | | |
|---|---|---|---|
| 5,468,451 A | 11/1995 | Gedeon | 454/256 |
| 5,480,611 A | 1/1996 | Mills et al. | 422/55 |
| 5,522,980 A | 6/1996 | Hobbs et al. | 204/432 |
| 5,554,912 A | 9/1996 | Thayer et al. | 315/157 |
| 5,598,141 A | 1/1997 | Grasmann et al. | 340/426 |
| 5,653,386 A | 8/1997 | Hennessee et al. | 237/12.3 B |
| 5,669,704 A | 9/1997 | Pastrick | 362/83.1 |
| 5,682,145 A | 10/1997 | Sweetman et al. | 340/632 |
| 5,693,943 A | 12/1997 | Tchernihovski et al. | 250/342 |
| 5,694,653 A | 12/1997 | Harald | 4/623 |
| 5,742,516 A | 4/1998 | Olcerst | 700/276 |
| 5,775,406 A * | 7/1998 | Ghitea, Jr. | 165/11.1 |
| 5,793,291 A | 8/1998 | Thornton | 340/573 |
| 5,856,646 A | 1/1999 | Simon | 200/600 |
| 5,859,479 A | 1/1999 | David | 307/10.8 |
| 5,910,239 A | 6/1999 | Maier et al. | 205/781 |
| 5,912,624 A | 6/1999 | Howard, II | 340/632 |
| 5,920,057 A * | 7/1999 | Sonderegger et al. | 235/384 |
| 5,938,321 A | 8/1999 | Bos et al. | 362/494 |
| 5,949,340 A | 9/1999 | Rossi | 340/573.1 |
| 5,952,732 A * | 9/1999 | Scarpitti | 307/10.3 |
| 6,018,292 A | 1/2000 | Penny, Jr. | 340/426 |
| 6,086,131 A * | 7/2000 | Bingle et al. | 296/76 |
| 6,130,614 A * | 10/2000 | Miller et al. | 340/573.4 |
| 6,139,172 A | 10/2000 | Bos et al. | 362/494 |
| 6,150,927 A * | 11/2000 | Nesbitt | 340/426 |
| 6,166,625 A | 12/2000 | Teowee et al. | 340/426 |
| 6,222,442 B1 * | 4/2001 | Gager et al. | 340/426 |
| 6,254,261 B1 | 7/2001 | Bingle et al. | 362/501 |
| 6,278,377 B1 | 8/2001 | DeLine et al. | 340/815.4 |
| 6,349,984 B1 | 2/2002 | Marrazzo et al. | 292/336.3 |
| 6,390,529 B1 | 5/2002 | Bingle et al. | 296/76 |
| 6,420,975 B1 | 7/2002 | DeLine et al. | 340/815.4 |
| 6,428,172 B1 | 8/2002 | Hutzel et al. | 359/838 |
| 6,460,906 B2 | 10/2002 | Bingle et al. | 296/336.3 |
| 6,480,103 B1 | 11/2002 | McCarthy et al. | 340/425.5 |
| 6,485,081 B1 | 11/2002 | Bingle et al. | 296/76 |
| 6,621,411 B2 | 9/2003 | McCarthy et al. | 340/425.5 |
| 6,692,056 B2 | 2/2004 | Bingle et al. | 296/76 |
| 6,783,167 B2 | 8/2004 | Bingle et al. | 296/76 |
| 6,832,793 B2 | 12/2004 | Bingle et al. | 292/336.3 |
| 6,902,284 B2 | 6/2005 | Hutzel et al. | 359/865 |
| 2005/0023858 A1 | 2/2005 | Bingle et al. | 296/76 |

FOREIGN PATENT DOCUMENTS

| | | |
|---|---|---|
| EP | 1039077 A2 | 9/2000 |
| EP | 1039077 A3 | 9/2000 |
| JP | 10-278564 A | 10/1998 |
| WO | WO98/36950 A | 8/1998 |
| WO | WO 99/04119 | 1/1999 |
| WO | WO99/04119 * | 1/1999 |
| WO | WO 00/58584 | 10/2000 |

OTHER PUBLICATIONS

National Safe Kids Campaign and General Motors Educate Public About Trunk Entrapment Hazards to Children.

"Total Recall", Home Technology, article from Popular Science, Jun. 1999 (1 page).

Figaro Sensor Materials, pp. 3-13, 15-17, 19-24 (1996-1999) (20 pages).

*Patent Abstracts of Japan*, vol. 1999, No. 1, Jan. 29, 1999, Abstracts for Japanese Published Patent Application JP 10-278564 A.

* cited by examiner

SYSTEM FOR DETECTING AND RELEASING A PERSON LOCKED IN THE TRUNK OF A VEHICLE

CROSS REFERENCE TO U.S. PRIORITY APPLICATION

This nonprovisional application claims the benefit of U.S. Provisional Application Ser. No. 60/131,189, filed Apr. 26, 1999.

BACKGROUND OF THE INVENTION

1. Technical Field of the Invention

The present invention concerns safety systems for operating automobiles and, more particularly, to such a system that detects the presence of a person in a closed trunk and releases the person under safe operational conditions.

2. Description of the Related Art

There have been well publicized reports of young children inadvertently locking themselves in the trunk of a vehicle, such as an automobile. Tragically, children can die under such circumstances, typically as a result of heat prostration while trapped in the sealed trunk.

It has been suggested that a trapped person could actuate an inside release mechanism to open the trunk. However, it is not certain that a young child would understand how to operate such a mechanism and it is therefore possible that the child would not be able to free himself by this means. There is therefore a need for a system that detects the presence of a person, particularly a small child, within a trunk and signals the need to open the trunk. It would also be advantageous for such a system to automatically trigger a trunk to open and release the trapped person when it is safe to do so, for example when the vehicle is stopped.

There is therefore a great need for an automatic trunk safety system. The apparatus and system of the invention has been developed to meet this need with simple, relatively low cost and reliable components that are easily integrated with the electronic control systems of existing vehicles. The above-mentioned features and other features of the invention will become apparent from a review of the following drawings, specification and claims.

SUMMARY OF THE INVENTION

One embodiment of the apparatus and system of the invention includes a sensor that detects $CO_2$ that is exhaled by a person trapped in the closed trunk of a vehicle. A microprocessor compares the level of $CO_2$ detected in the trunk to a baseline level of $CO_2$ that was measured the last time the trunk was opened. If excessive $CO_2$ is detected, the microprocessor determines the operational state of the vehicle and takes programmed steps to provide an alarm and to automatically open the trunk if the vehicle is not moving.

Other embodiments of the invention can use infrared sensors or electrostatic (i.e., capacitive) sensors to detect a person in the trunk. Systems with such sensors would also operate automatically to provide an alarm and to open the trunk under safe operational conditions.

BRIEF DESCRIPTION OF THE DRAWINGS

Figure 1A:
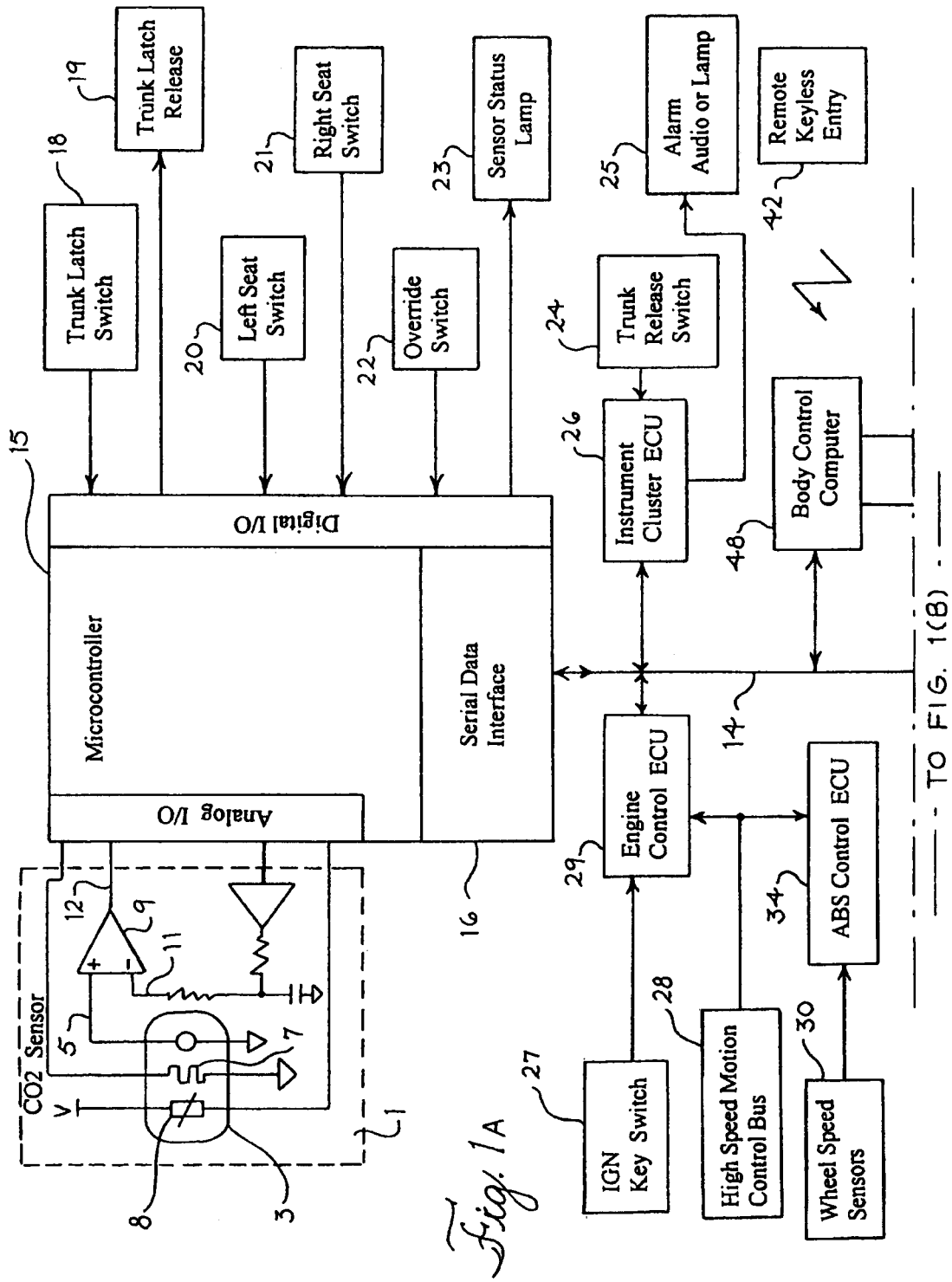
Figure 1B:
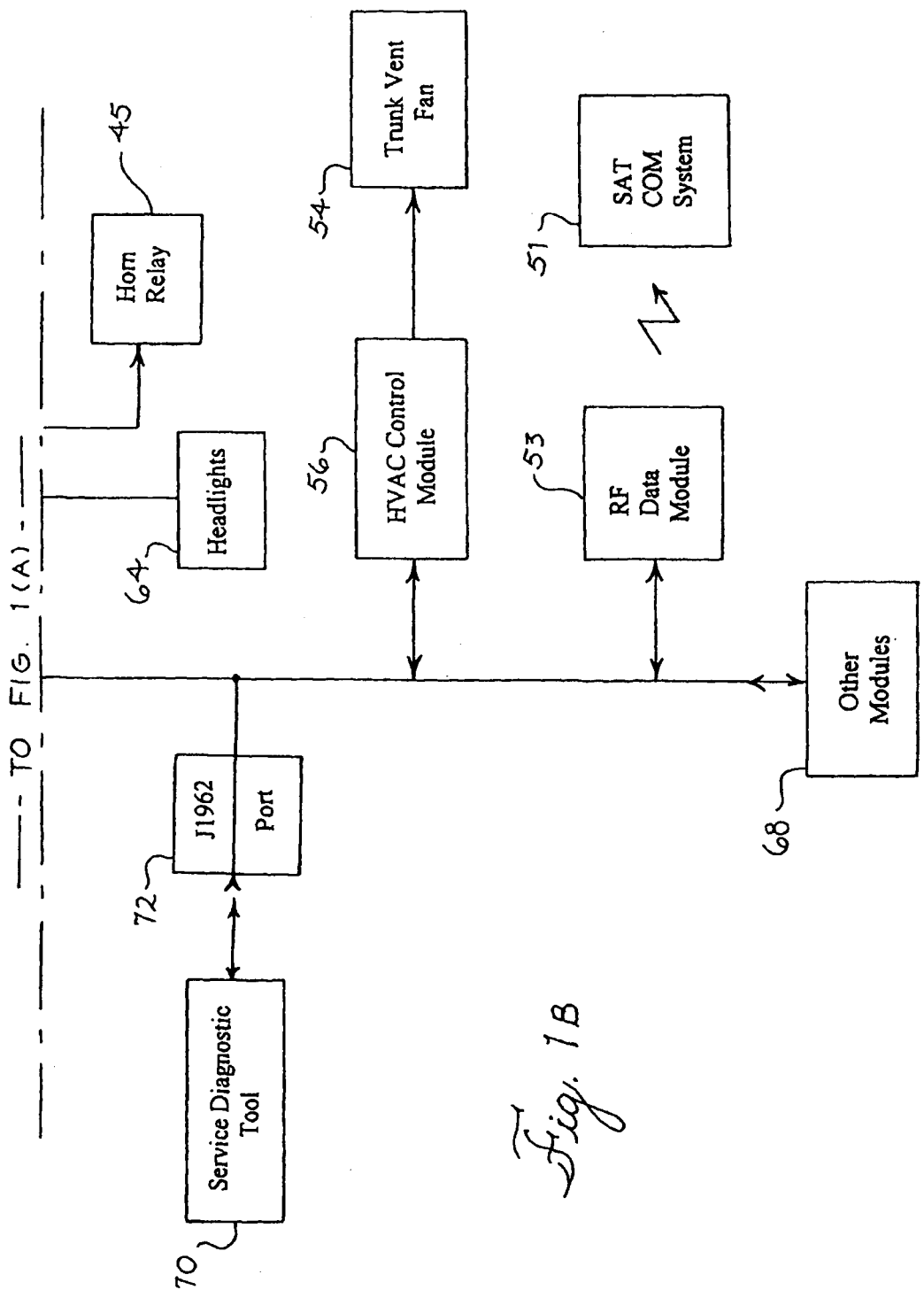

FIGS. 1A and 1B are a block diagram of the $CO_2$ sensor, microcontroller and related apparatus that provide the trunk safety features of the invention.

Figure 2A:
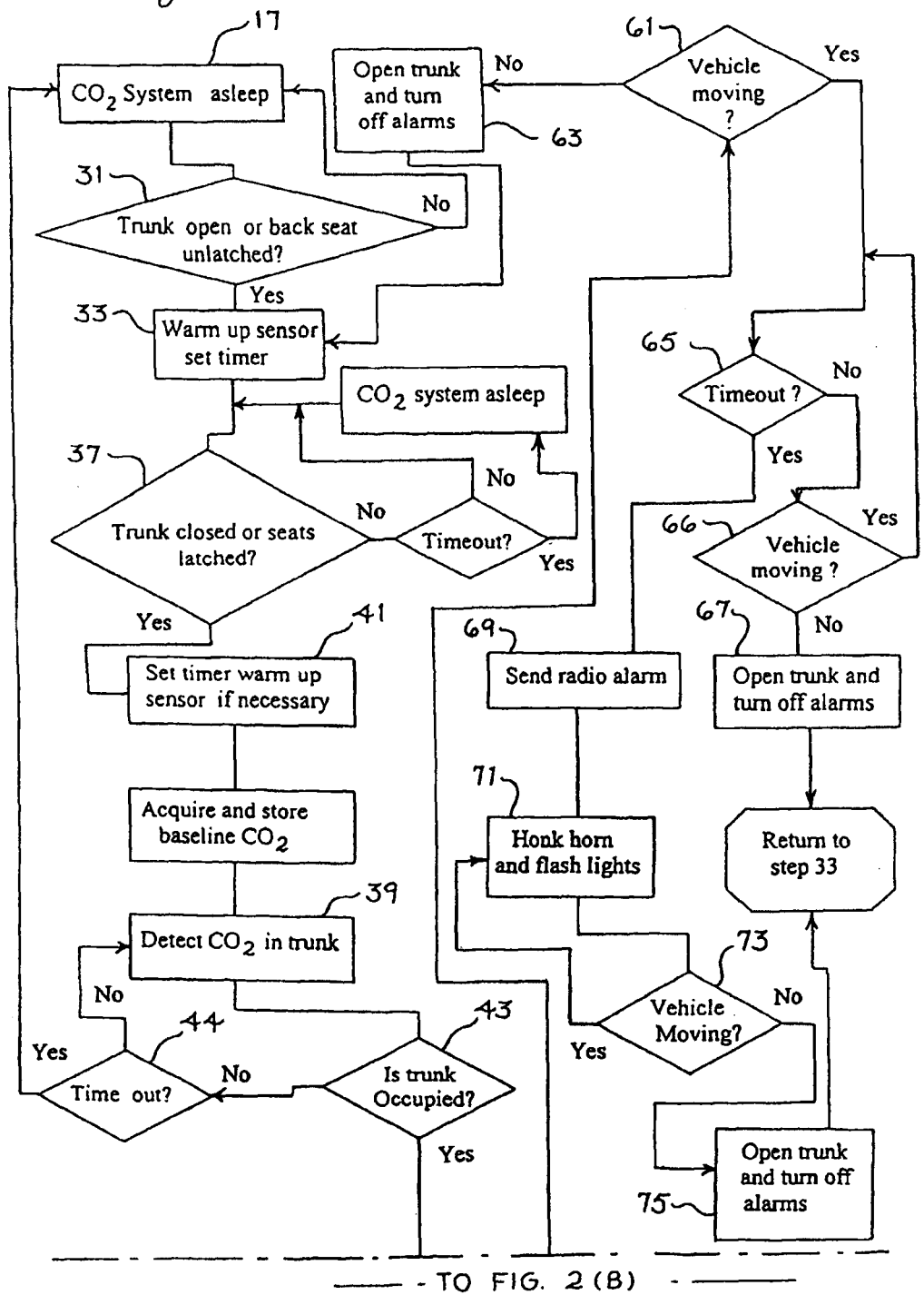
Figure 2B:
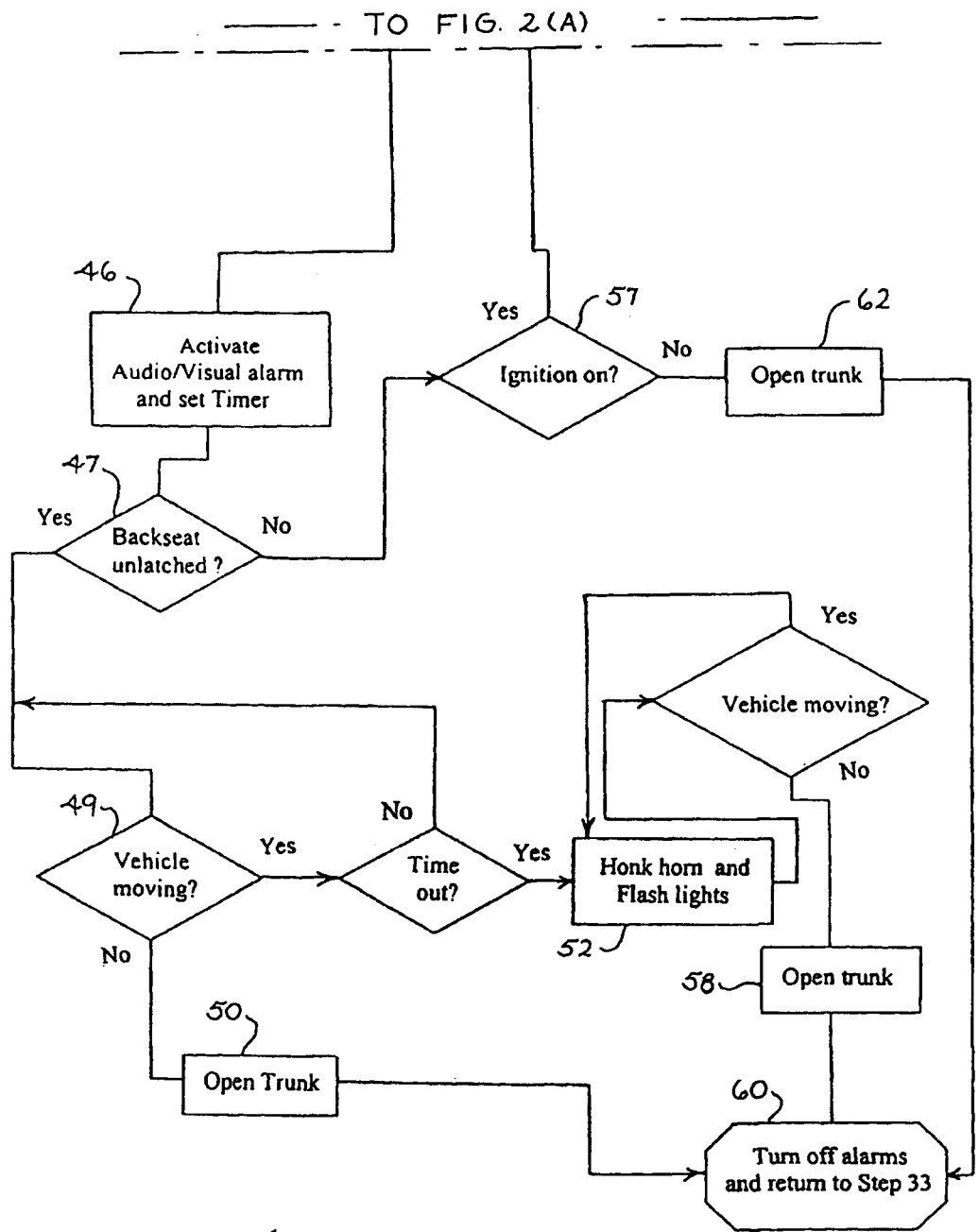

FIGS. 2A and 2B are a flow chart of program steps used by the microcontroller to implement the trunk safety system of the invention.

DETAILED DESCRIPTION OF THE PREFERRED EMBODIMENTS

In the drawings, elements are not necessarily drawn to scale, and the same reference numbers through several views designate the same or similar elements. FIGS. 1A and 1B illustrate a block diagram of components of the system of the invention in association with known electronic components of a modern vehicle. As shown in FIG. 1A, a $CO_2$ sensor 1 includes the elements shown within the dashed lines. This sensor has a $CO_2$ sensing component 3 that detects the level of $CO_2$ in the trunk of a vehicle such as an automobile.

$CO_2$ sensors are commercially available. A preferred sensor is sold by Figaro USA, Inc. of Glenview, Illinois with the model designation TGS4160. This solid electrolyte sensor generates an output voltage on a line 5 that corresponds to the level of detected $CO_2$. The sensor includes a heater element 7 that must be energized in initial operation to heat the sensor to a specific operational temperature. The sensor therefore requires some initial time, for example, about 2 minutes, to stabilize before it can make a reliable $CO_2$ reading. A thermistor 8 senses the temperature of the sensor and applies a corresponding voltage to a microcontroller 15 that, as an example, may be a model 68HC705P6A device which is commercially available from Motorola. The output voltage of the sensor is applied to the plus input of a difference operational amplifier 9 that also receives at its minus input 11 a reference voltage from the microcontroller 15. The operational amplifier 9 generates an output voltage on line 12 that corresponds to the difference between the voltage at its plus and minus inputs.

It has been found that the response time of an internal thermistor of the preferred $CO_2$ sensor is generally too slow for use in a commercial $CO_2$ vehicle detection system. An external thermistor 8 with a relatively rapid response time must therefore be used. This thermistor must detect the temperature of the $CO_2$ sensing element so that the microcontroller can compensate for changes in sensor temperature and thereby accurately detect the level of $CO_2$.

In initial operation, the reference voltage at 11 from the microcontroller 15 is adjusted to produce a particular voltage, for example 4 Volts, from the operational amplifier 9 at output 12. This reference voltage at 11 represents the baseline $CO_2$ concentration and is held constant through the monitoring cycle. The signal at the operational amplifier output 12 is amplified within the microcontroller, temperature compensated and monitored for changes.

If a person is thereafter trapped in the trunk, the level of $CO_2$ will gradually rise above the background level. As the concentration of $CO_2$ in the trunk rises, the voltage on the line 5 decreases and the amplifier 9 generates a voltage that corresponds to the difference between the decreased voltage on the line 5 and the background reference voltage on the line 11. The output of the amplifier at 12 therefore corresponds to the relative increase in the concentration of $CO_2$ from the baseline. The "delta" voltage corresponding to the change in the concentration of $CO_2$ is applied to the microcontroller and, if a specified magnitude of this voltage, for example 1 volt, is maintained for a specified time, for example 30 seconds, the microcontroller registers an alarm. The alarm magnitude of $CO_2$ may be set to correspond to the respiration of the lowest weight person within the parameters of the system.

The microcontroller 15 receives vehicle status signals and transmits control signals over a serial bus 14, through a serial data interface 16 that may operate with the J1850 or Controller Area Network protocols as an example. Other protocols could also be used.

With reference to FIG. 1A as an example, the microcontroller may be hardwired to a trunk latch switch 18, a trunk release solenoid 19, left and right rear seat switches that indicate the latched or unlatched condition of these seats at 20 and 21, an override switch for temporarily disarming the $CO_2$ sensor at 22 and a status lamp at 23 that indicates the operational condition of the $CO_2$ detection system, for example by blinking.

The serial bus communicates with the instrument cluster electronic control unit 26 which receives a signal from the manual trunk release switch 24 and controls a $CO_2$ panel alarm lamp and/or audio alarm 25. An engine control module 29 monitors the operational state of the ignition key switch 27 and interacts in a known manner with an automatic braking system 34 that connects with a high-speed motion control bus 28 and receives signals from wheel speed sensors 30 that indicate whether the vehicle is moving. With reference to FIGS. 1A and 2A, a body control computer 48 controls a relay 45 that operates the vehicle horn and lights and responds to a remote keyless entry system 42 in a known manner. A radio frequency data module 53 can be actuated to send radio alarm signals to a remote security station via a satellite communication system 51 in a known manner. A heating, ventilation and air-conditioning module 56 operates a vent fan 54 in a known manner. The fan could be disposed to vent the trunk, for example, in response to a $CO_2$ alarm. A known plug-in service diagnostic tool 70, other known vehicle control modules 68 and the headlights 64 are connected and operated on the serial data bus 14 in a known manner. All of the apparatus on the serial bus is monitored and controlled through the microcontroller 15 that also controls the operation of the $CO_2$ detection system. If necessary, the microcontroller could be implemented with flash memory to facilitate program changes in the field.

As an alternative to the use of a serial data bus to send and receive vehicle control signals, the microcontroller 15 could be directly connected to send and receive these signals using a dedicated wire for each signal. In such a system, an ignition on signal from the ignition key switch 27 would connect directly to the microcontroller 15, rather than indirectly through the engine control ECU 29 and a serial data bus 14. Likewise, wheel speed sensors 30, trunk release switch 24, audio alarm or lamp 25, headlights 64, horn relay 45, trunk vent fan 54, and any other such vehicle control apparatus would connect directly to the microcontroller, rather than through associated modules and a serial data bus.

FIGS. 2A and 2B illustrate a flow chart of microprocessor program steps that implement the system of a preferred embodiment of the invention. As shown at the top of FIG. 2A, for the purpose of this discussion, the $CO_2$ detection system is initially assumed to be in a sleep state at 17 wherein the system waits for an activation condition. The system is awakened or activated at least in response to opening the trunk of the vehicle or unlatching either of the back seats. With reference to FIG. 1A, when the trunk is opened or at least one back seat is unlatched, the switches 18, 20, 21 indicate the activation condition. The activation signal is passed to the microcontroller 15, for example over a hardwired connection.

With reference to FIG. 2A, the microcontroller 15 therefore detects the activation condition at 31 and wakes up and sets a delay time to process $CO_2$ information. With reference to FIG. 1A, when the microcontroller 15 wakes up, it begins to monitor the $CO_2$ sensor 3. The heater 7 is then turned on, the system then waits for the sensor to heat up, for example for about 2 minutes, and the microcontroller 15 then waits for the trunk to close or the back seats to latch at 37.

The microcontroller checks the condition of the trunk and seats at 37 by interrogating the switches 18, 20, and 21. If the switches do not close within a predefined delay time, for example several minutes, the microcontroller is put to sleep to await activation by closing the trunk or latching the seats. When activated, the baseline $CO_2$ is acquired and stored, a timer is set and, if necessary, the sensor is warmed up. The concentration of $CO_2$ in the trunk is measured at 39 during a predefined time-out interval of, for example 20 minutes. If an increase in the level of $CO_2$ is detected in an amount that would be exhaled by a human being, the "trunk occupied" condition is triggered at 43. The system is put to sleep if the timer times out at 44.

Experimentation and investigation have indicated that healthy human beings in a calm, relaxed or sleeping state, that is their basal metabolic rate, exhale $CO_2$ in amounts proportional to their body surface area and age. When active, frightened or otherwise agitated healthy human beings exhale $CO_2$ in amounts greater than their basal metabolic rate. Thus, for example, an individual 180 pounds, 35 years old, 5'10" and male would exhale about 200 milliliters of $CO_2$ per minute in his basal metabolic rate. An individual 20 pounds, 18 months old and 3'0" would exhale about 85 milliliters of $CO_2$ per minute in his/her basal metabolic rate. An infant of 7 pounds is estimated to exhale about 22 milliliters of $CO_2$ per minute. The microcontroller 15 is programmed to measure the increase in $CO_2$ within the trunk over time in relation to the measured base line $CO_2$ and make a determination that the increasing $CO_2$ results from the respiration of a human being.

As an initial approximation, if the largest trunk contains about 566 liters of air, it has been determined that the $CO_2$ sensor will detect respiration at about 353 PPM (parts per million) per minute for an adult, 150 PPM per minute for a toddler and about 38 PPM per minute for an infant. This increase in measured $CO_2$ over a reasonable time, for example up to several minutes, distinguishes the respiration of a human being from expected changes in ambient $CO_2$. The detection of a gradual increase in $CO_2$ also serves to distinguish an abrupt increase in $CO_2$ that might result if a person intentionally injects $CO_2$ into the trunk in an effort to confuse the $CO_2$ detection system. As an example, it has been found that human respiration can be distinguished by measuring a predetermined change in the output voltage of the operational amplifier 9 of FIG. 1, for example a change of about 1 volt, for an interval of about 30 seconds.

With reference to FIG. 2A, if an occupant is not detected in the trunk within a predefined set time, the timer times out at 44 and the microcontroller 15 terminates its detection of $CO_2$ and sets itself in a low power sleep mode defined at step 17. The microcontroller will remain asleep until the trunk is opened again or at least one rear seat is unlatched.

As shown at FIG. 2B, if the level of $CO_2$ detected in the trunk indicates an occupant is present, the microcontroller 15 at step 46 turns on the $CO_2$ lamp 25 of FIG. 1A and/or provides an audio alarm on the front console of the vehicle, sets a timer and checks the condition of the latches on the back seats of the vehicle at step 47.

If a back seat is unlatched, the trunk is ventilated through the airspace provided by the unlatched seat and the level of alarm is therefore reduced. As shown at step 47, if a back seat is unlatched, the movement of the vehicle is checked at 49 and the front console alarms are continued for a time-out period. If the vehicle stops during this period, the trunk is automatically opened by the trunk release solenoid 19 (FIG. 1A) at step 50 to allow the person to escape safely. The alarms are then turned off and program control is returned to step 33 (FIG. 2A). If the vehicle continues moving, the timer times out, and at step 52 the horn is activated at 45, 48 and the headlights are flashed at 64 (FIGS. 1A and 1B). This continues for as long as the vehicle continues moving. If the vehicle stops, the trunk is automatically opened at step 58 to allow the person to escape, the alarms are turned off at step 60 and program control is returned to step 33. When the trunk is closed, the $CO_2$ concentration is checked and the system is put to sleep if there is no alarm condition or, if the trunk remains open beyond a time-out interval, the system is put to sleep until the trunk is closed.

If an occupant is detected in the trunk and it is found at step 47 that the back seats are latched, the status of the ignition system 27, 29 (FIG. 1A) is then checked at step 57 (FIG. 2B). If the ignition is turned off, the microcontroller 15 sends an "open trunk" signal to the trunk release solenoid 19 (FIG. 1A) at step 62 (FIG. 2B) and therefore causes the trunk to open. The trunk is opened in this situation because the vehicle is stopped and it is therefore safe to open the trunk and allow the occupant to escape. After opening the trunk, the alarms are turned off and program control is returned to step 33.

If the sensed condition of the ignition at step 57 is "on", the microcontroller 15 at step 61 (FIG. 2A) determines whether the vehicle is moving by analyzing wheel speed signals from sensors 30 of FIG. 1A. If the vehicle is not moving, the trunk is automatically opened at step 63, the alarms are turned off and program control is returned to step 33. The trunk may be opened in these circumstances, because, even though the ignition is on, the vehicle is not moving and it is therefore safe for the occupant to leave the trunk.

If the vehicle is moving at step 61, the microcontroller 15 times out a predetermined interval at step 65 and continuously checks at step 66 to determine if the vehicle remains moving during this interval. If the vehicle stops during this interval, the trunk is opened at step 67 to allow the occupant to escape, the alarms are turned off, and control is returned to step 33 as previously described. If the vehicle is still moving at the end of the time-out interval of step 65, a higher level of alarm is generated at step 69 by triggering a radio alert at 51, 53 (FIG. 1B) to call a remote security station. Also, at step 71, the horn is actuated and the lights are flashed as previously described. When these higher level alarms are set, the movement status of the vehicle is again checked at step 73 and, if the vehicle stops, the alarms are turned off and the trunk is opened at step 75 and program control is returned to step 33 as previously described. If the vehicle continues to move, alarms continue to operate until the vehicle stops.

This $CO_2$ detection and response system may operate with an exit switch that is located in the trunk and lighted for a predefined time after the trunk is closed. If this switch is activated by a person trapped in the trunk, the microcontroller 15 will wake up and open the trunk or provide appropriate alarms depending upon the operational state of the vehicle. An override switch may be activated when the trunk is open to prevent the trunk from automatically opening after it is closed. This override condition could be automatically released when the trunk is manually opened again. It has been suggested that the override switch could have the same effect as the exit switch if the override switch is pressed when the trunk is closed.

Variations and modifications of the embodiments disclosed herein may be made without departing from the scope and spirit of the invention. For example, the $CO_2$ detector may be replaced or augmented by infrared and electrostatic capacitive sensors. At present it is believed that use of a $CO_2$ sensor is preferred, because infrared and electrostatic sensors might not be able to detect a person if, for example, the trunk is partially filled with cargo. The system could also be modified to open an air vent to the trunk or partially open the trunk to allow ventilation in the event of an alarm condition. Additional conditions would also be defined to wake up the microcontroller to process peripheral equipment or interrupts for vehicle systems other than the $CO_2$ system. The system of the invention could also be used to monitor $CO_2$ in the cabin of a vehicle, in order to detect the presence of an occupant, especially a young child on a hot day, and then take safety precautions such as opening vents or windows and generating audio, visual or radio alarms. Indeed, the system of the invention could detect $CO_2$ respiration in any enclosure and could automatically take any required safety precautions or activate any required alarms. The aforementioned description of embodiments of the invention is therefore intended to be illustrative rather than limiting and it should therefore be understood that the following claims and their equivalents set forth the scope of the invention.

The invention claimed is:

1. A method for monitoring the trunk of a vehicle, comprising the steps of:
    detecting the respiration of a living person or animal in the closed trunk of a vehicle;
    detecting the operational condition of the vehicle; and
    automatically opening the trunk of the vehicle in response to a predefined safe operational condition of the vehicle and the detection of the respiration of the living person or animal in the trunk.

2. The method of claim 1, wherein said step of detecting the respiration of a living person or animal includes the step of detecting the $CO_2$ exhaled by the person or animal in respiration.

3. The method of claim 1, wherein said step of detecting the respiration of a living person or animal includes the step of detecting a rise in the level of $CO_2$ in the trunk over time in relation to a predefined baseline $CO_2$.

4. The method of claim 1, wherein said step of detecting the respiration of a living person or animal includes the steps of:
    detecting a baseline concentration of $CO_2$ after the trunk has been opened;
    comparing the concentration of $CO_2$ measured for a time after the trunk is closed to the baseline concentration of $CO_2$; and
    detecting the respiration of a living person or animal when the concentration of $CO_2$ in the trunk exceeds the baseline concentration by a predetermined amount for a predetermined time.

5. The method of claim 1, further including the steps of providing a lighted switch in the trunk; and having a person in the trunk manually activate the switch to open the trunk from the inside.

6. The method of claim 1, including the step of automatically opening the trunk of the vehicle when the vehicle is stopped and a living person or animal is detected in the trunk.

7. The method of claim 1, including the step of providing an alarm but not opening the trunk when a living person or animal is detected in the trunk and the vehicle is moving.

8. The method of claim 1, including the step of providing an alarm but not opening the trunk when a living person or animal is detected in the trunk and a back seat of the vehicle is unlatched to ventilate the trunk.

9. The method of claim 1, including the step of providing an audible alarm in the vehicle in response to detecting a living person or animal in the trunk.

10. The method of claim 1, including the step of providing a visible alarm in the vehicle in response to detecting a living person or animal in the trunk.

11. The method of claim 1, including the step of providing an alarm signal to a security center in response to detecting a living person or animal in the trunk.

12. The method of claim 1, including the step of activating the horn of the vehicle in response to detecting a living person or animal in the trunk.

13. The method of claim 1, including flashing the headlights of the vehicle in response to detecting a living person or animal in the trunk.

14. A method for determining the respiration of a living person or animal in an enclosure, comprising the steps of:
ventilating the enclosure to ambient air and automatically sensing a base line concentration of $CO_2$ in the vented enclosure;
closing the enclosure to ambient air and automatically sensing an increase in the concentration of $CO_2$ above said base line concentration for a predetermined time after the enclosure is closed to ambient air; and
providing a rescue operation in response to detecting $CO_2$ above said base line concentration which is consistent with what would be produced by respiration of a living person or animal in the closed enclosure.

15. The method of claim 14, further including the steps of using a vehicle trunk as the enclosure and automatically opening the trunk of the vehicle as a rescue operation when the vehicle is stationary.

16. The method of claim 15, further including the steps of providing a lighted switch in the trunk; and having a person in the trunk manually activate the switch to open the trunk from the inside.

17. The method of claim 14, further including the steps of using a passenger compartment of a vehicle as the enclosure and automatically ventilating the compartment as a rescue operation.

18. The method of claim 14, further including the step of detecting the respiration of a living person or animal when the concentration of $CO_2$ in the closed enclosure exceeds the base line concentration of $CO_2$ by a predetermined amount for a predetermined time.

19. An apparatus for sensing the presence of a person in the trunk of a vehicle, comprising:
a $CO_2$ sensor for detecting a baseline concentration of $CO_2$ after the trunk has been opened and the concentration of $CO_2$ for a time after the trunk is closed; and
a microcontroller for comparing the concentration of $CO_2$ when the trunk is closed to the baseline concentration of $CO_2$ and generating an alarm indicating the presence of a person in the trunk when the concentration of $CO_2$ in the closed trunk exceeds the baseline concentration of $CO_2$ by a predetermined amount for a predetermined time.

20. The apparatus of claim 19, including a lighted switch disposed in the trunk for manually opening the trunk from the inside.

21. The apparatus of claim 19, including means for sensing the movement of the vehicle and means for opening the trunk when a person is sensed in the trunk and the vehicle is stopped.

22. A method for determining the presence of a person in a closed trunk of a vehicle, comprising the steps of:
sensing a base line concentration of $CO_2$ in the trunk with at least one opening to ambient air;
sensing an increase in concentration of $CO_2$ above said base line concentration when the trunk is closed to ambient air; and
generating an alarm in response to detecting $CO_2$ above said base line concentration which is consistent with what would be produced by respiration of a person in the closed trunk.

23. The method of claim 22, further including the steps of ventilating the trunk in response to said alarm.

24. The method of claim 22, further including the step of ventilating the trunk in response to said alarm and the detection of a predefined temperature in the closed trunk.

25. The method of claim 1, including providing an alarm when the respiration of the living person or animal is detected.

26. The method of claim 1, including providing an alarm when the respiration of the living person or animal is detected and selecting the type of alarm based upon the operational condition of the vehicle.

27. A method for controlling a vehicle having a compartment that is opened and closed, comprising the steps of:
detecting the respiration of a living person or animal in the closed compartment of the vehicle;
detecting the operational condition of the vehicle; and
automatically opening the compartment of the vehicle to ambient air in response to a predefined operational condition of the vehicle and the detection of the respiration of the living person or animal in the compartment.

28. A method for controlling a vehicle having a trunk that is opened and closed, comprising the steps of:
detecting the respiration of a living person or animal in the closed trunk of the vehicle;
detecting the operational condition of the vehicle;
automatically selecting at least one of a plurality of alarms based upon the operational condition of the vehicle and the detected respiration of the living person or animal in the trunk; and
activating the at least one selected alarm.

29. A method for controlling a vehicle having a trunk that is selectively opened and closed, comprising the steps of:
detecting the respiration of a living person or animal in the closed trunk of the vehicle; and
automatically opening the trunk in response to at least detecting the respiration of the living person or animal in the trunk.

30. A method for detecting an unsafe condition within a trunk of a vehicle, comprising the steps of:
disposing a living person or animal within the closed trunk of the vehicle; and
detecting the respiration of the living person or animal in the trunk.

31. A detection system for use within a vehicle of the type having a trunk which is selectively movable between an open and a closed position, said detection system being adapted to detect the breathing of a breathing individual within said trunk, said detection system comprising:
a breathing detector which is disposed within said trunk, which is adapted to detect the breathing of said individual, and which generates a signal upon the detection of said breathing; and
a controller assembly which is communicatively coupled to said breathing detector, which receives said signal, and which opens said trunk upon receipt of said signal.

32. The detection system of claim 31, wherein carbon dioxide is emitted by said individual as said individual breathes and wherein said breathing detector detects the presence of said carbon dioxide within said trunk.

33. The detection system of claim 31, wherein said vehicle is of the further type which includes an ignition switch which may be selectively moved to a certain position and wherein said controller assembly is coupled to said ignition switch, senses said placement of said ignition switch in said certain position, and causes said trunk to be opened in response to said signal from said breathing detector only if said ignition switch is placed in said certain position.

34. The detection system of claim 31, wherein said vehicle is of the type which is selectively driven and wherein said controller assembly prevents said trunk from being open when said vehicle is driven.

35. The detection system of claim 31, further including an illuminated switch which is disposed within said trunk, which is coupled to said controller assembly, and which selectively communicates a second signal to said controller assembly upon being touched.

36. The detection system of claim 35, wherein said controller assembly, upon receipt of said second signal, opens said trunk.

37. The detection system of claim 32, wherein said breathing detector measures the amount of carbon dioxide which is resident within said trunk, stores a certain value, compares said measured amount of carbon dioxide to said certain value, and generates said signal only if said measured amount of said carbon dioxide is greater than said certain value.

38. The detection system of claim 31, wherein said controller assembly further includes a timer which allows said detection system to be operable for a certain period of time.

39. The detection system of claim 31, wherein said individual comprises a child.

40. A method for detecting the presence of a child within a trunk of a vehicle, said method comprising the steps of:
   measuring an amount of carbon-dioxide within said trunk of said vehicle; and
   using said measured amount of carbon dioxide to determine the presence of said child within said trunk of said vehicle.

41. The method of claim 40, further comprising the step of detecting said presence of said child only when said vehicle is stationary.

42. An assembly for detecting the presence of an individual within a trunk of a vehicle, said assembly comprising:
   a sensor which is mounted within said trunk and that detects the occurrence of breathing of said individual; and
   a controller assembly which is communicatively coupled to said sensor and which provides a signal when said sensor detects the occurrence of breathing of said individual.

43. The assembly of claim 42, wherein said sensor comprises a carbon dioxide sensor.

* * * * *